C. V. MORSE.
OIL COOLING SYSTEM FOR EXPLOSIVE ENGINES.
APPLICATION FILED OCT. 24, 1919.
1,336,368. Patented Apr. 6, 1920.
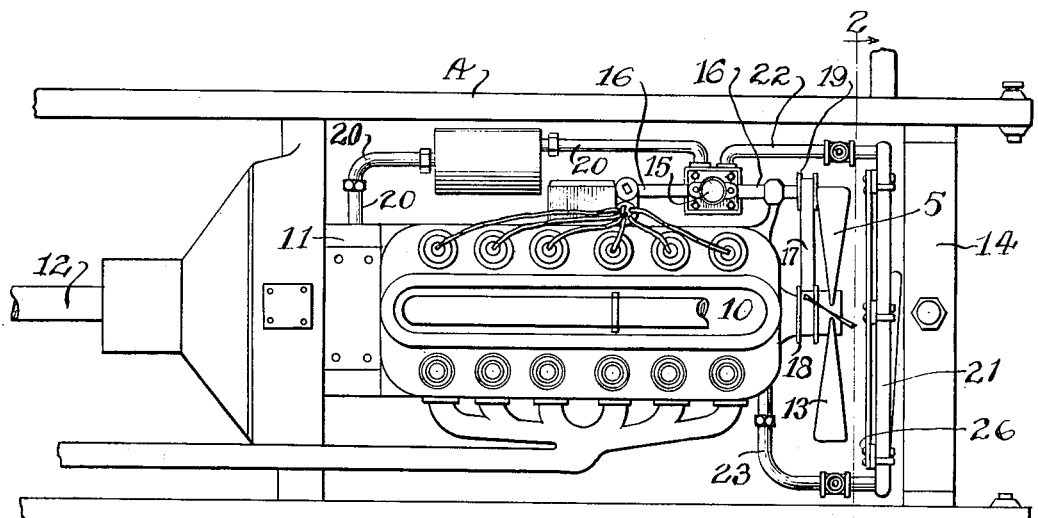
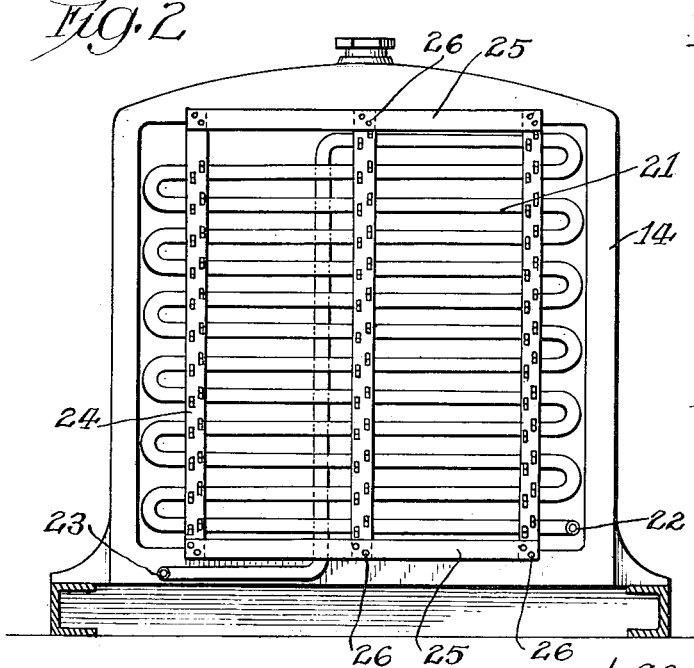
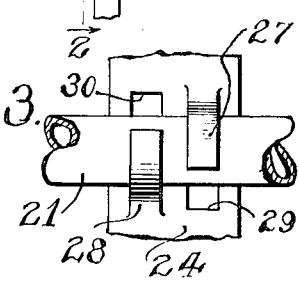
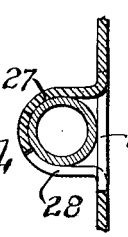
Inventor:
Clyde V. Morse

UNITED STATES PATENT OFFICE.

CLYDE V. MORSE, OF GALESBURG, ILLINOIS.

OIL-COOLING SYSTEM FOR EXPLOSIVE-ENGINES.

1,336,368.   Specification of Letters Patent.   Patented Apr. 6, 1920.

Application filed October 24, 1919. Serial No. 332,957.

*To all whom it may concern:*

Be it known that I, CLYDE V. MORSE, a citizen of the United States, and a resident of Galesburg, in the county of Knox and State of Illinois, have invented certain new and useful Improvements in Oil-Cooling Systems for Explosive-Engines; and I do hereby declare that the following is a full, clear, and exact description thereof, reference being had to the accompanying drawings, and to the letters of reference marked thereon, which form a part of this specification.

This invention relates to new and useful improvements in oil cooling systems for explosive engines and more particularly engines of this type used in trucks, tractors and other vehicles, although it may also be used in connection with engines employing superheated steam.

In such engines and particularly internal combustion engines, the normal operation is conducive to the generation of considerable heat. Even where the engine is provided with the usual cold water jacket or other cooling apparatus, the heat of the cylinder raises the temperature of the metal of the parts associated therewith to a considerable degree.

In gas engines, the oil is generally splashed by the action of the crank and spread in a suitable film over either the surface of the piston or the inner wall of the cylinder, and taken up by the piston in its reciprocation, thus affording a proper lubrication for the piston. Great difficulty, however, is experienced in this type of engines in securing such proper lubrication due to the fact that the fire of the exploding charges burns or chars the thin film of oil upon the inner wall of the cylinder, which is necessary for effecting lubrication.

In internal combustion engines, the leakage of the hot gases past the piston and into the crank case, as well as other conditions, tends to heat the oil carried in the crank case to an excessive degree. The oil thus loses much of its body while so heated and loses much of its value as a lubricant, particularly as the oil for heavy vehicles, such as trucks and motors, should have considerable body. Moreover, by reason of the excessive heating, the oil is more liable to become readily charred or burned.

The main object of my invention, therefore, is to supply a simple and yet exceedingly efficient system whereby the oil in the crank case will be maintained at relatively low temperature while the engine is in operation and whereby when the steam is applied to transmission boxes and the like containing revolving gears, there will be no tendency to overheat the oil, and a more efficient operation of the mechanism will be insured.

These and other objects of the invention will be more fully understood as I proceed with my specification.

The accompanying drawings, it will be noticed, are illustrative rather than definitive. No attempt is made to show such details of construction as would be apparent to any mechanic conversant with the art, the general idea being sufficiently illustrated to teach one skilled in the art the scope and usefulness of the invention, and to construct and put the same into practice.

In the drawings:

Figure 1 is a plan view of a portion of a vehicle provided with an internal combustion engine to which my cooling system has been applied.

Fig. 2 is an enlarged front elevation of the radiator of such a vehicle to which the radiator device of my oil cooling system is attached; the elevation being taken on the plane 2—2 of Fig. 1.

Fig. 3 is a plan view, enlarged, of a detail of the construction as hereinafter described.

Fig. 4 is a sectional view, enlarged, taken on the plane of the line 4—4 of Fig. 3.

Referring now more particularly to Figs. 1 to 4 inclusive, the supporting frame of the vehicle is indicated as a whole, by the letter A; the numeral 10 indicates the motor of an internal combustion engine, provided with the usual crank case 11; the motor shaft 12 being provided at its forward end with a fan 13, located as shown between the motor 10 and the usual radiator 14. 15 is an oil pump actuated from a pump shaft 16, supported in any convenient manner in bearings, and driven by a belt 17 running over pulleys 18 and 19 on the motor shaft and pump shafts respectively. 20 is an oil pipe line leading from the crank case 11 to the pump 15, and 21 is an oil radiator as a whole, united by a pipe 22 with the pump 15 and by a return pipe 23 with the crank case. The oil is drawn from the crank case into the pump 15 through the intake pipe 20 and forced out through the pipe 22 through the oil radiator 21 and thence passes through the return pipe 23 to the crank case 11.

The oil radiator 21 in this instance is comprised of a plurality of loops, suitably secured to a frame, which in turn is secured to the main radiator 14. This frame comprises a plurality of vertically arranged bars 24, joined at their ends to top and bottom transverse connecting bars 25, 25, by rivets or bolts 26, or other suitable means. The bolt 26 may also serve to secure the frame, as a whole, to the radiator 14. The vertically arranged plates or bars 24 of the frame are provided with holding clips cut from the plate and bent as desired. These clips are indicated at 27 and 28, respectively, and are stamped out, so that their free ends may be folded or bent in opposite directions, as clearly shown in Figs. 3 and 4. For example, the clip 27 has its free end below and when bent outwardly and downwardly, leaves an aperture 29 below it; while the clip 28 being bent outwardly and upwardly, leaves an aperture 30 above it.

The horizontal rows of radiator pipes 21 lie against the plate 24 and are held from upward movement by the clip 27 which partially embraces its top and outer segments, and are held from falling downwardly by the clip 28 which embraces its lower and front segment. I find that this is a cheap and convenient method of securing the radiator device to the frame though, of course, any other suitable means may be employed.

This device is simple and cheap in construction, but very effective in operation, and results in use, in maintaining a very much lower temperature of the oil. This results in a better and more efficient lubrication.

I claim as my invention:

1. In a circulatory oil cooling system, an oil radiator comprising a plurality of pipes, bent back and forth in horizontal arrangement, a frame on which said pipes are laid, and means on the frame members for securing the pipes thereto.

2. In a circulatory oil cooling system, an oil radiator comprising a plurality of pipes bent back and forth in horizontal arrangement, a frame on which said pipes are laid, and means on the frame members for securing the pipes thereto, said means comprising oppositely directed and bent lugs, the free ends of which are stamped out from the frame members.

In testimony that I claim the foregoing as my invention I affix my signature in the presence of two witnesses, this 20th day of October, A. D. 1919.

CLYDE V. MORSE.

Witnesses:
M. E. ZETTERHOLM,
A. C. STRICKLAND.